W. F. CREMEAN AND W. E. WINE.
BRAKE SHOE KEY LOCK.
APPLICATION FILED MAR. 20, 1919.
1,309,186.
Patented July 8, 1919.
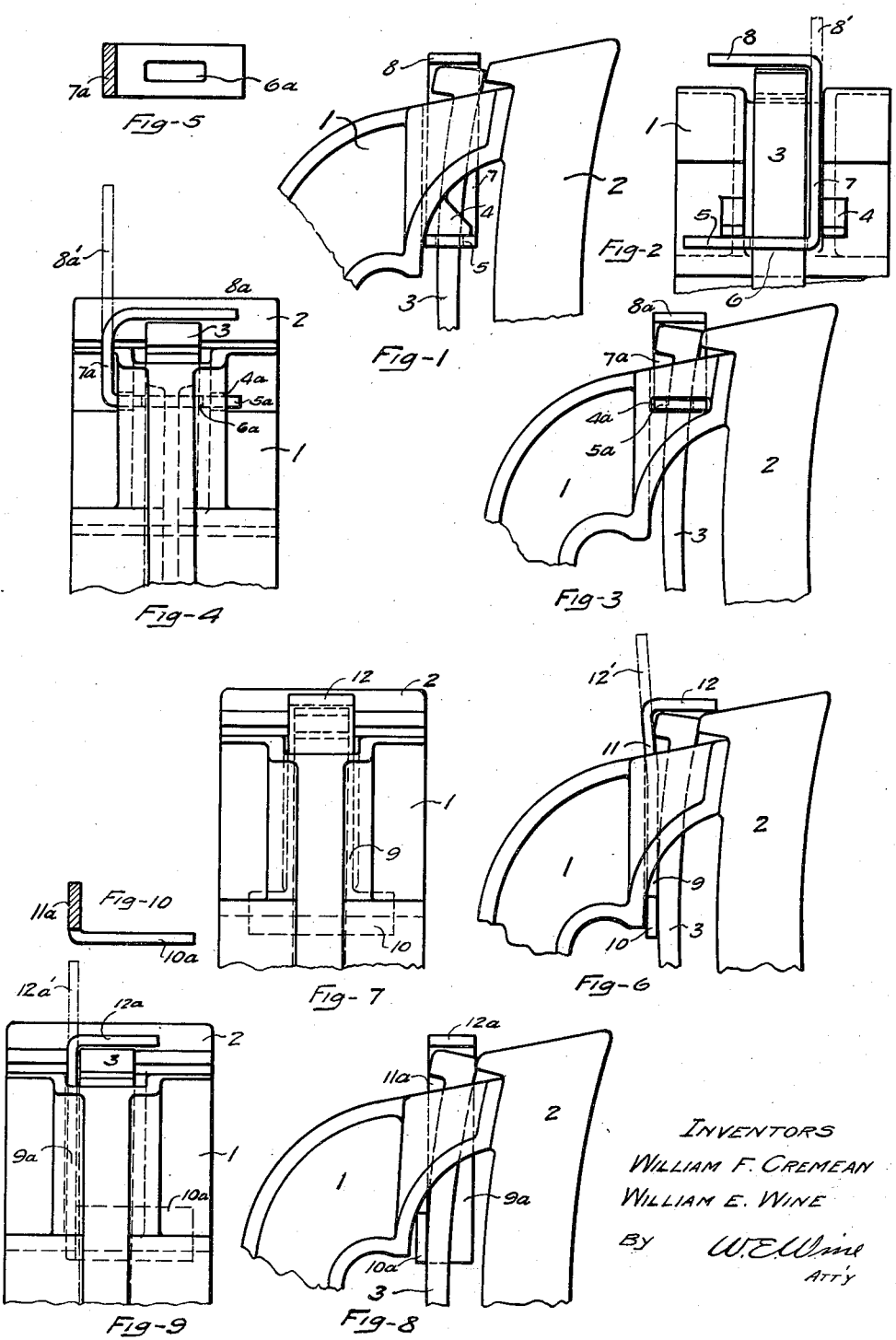

UNITED STATES PATENT OFFICE.

WILLIAM F. CREMEAN, OF WILKES-BARRE, PENNSYLVANIA, AND WILLIAM E. WINE, OF TOLEDO, OHIO.

BRAKE-SHOE-KEY LOCK.

1,309,186.   Specification of Letters Patent.   Patented July 8, 1919.

Application filed March 20, 1919. Serial No. 283,867.

*To all whom it may concern:*

Be it known that we, WILLIAM F. CREMEAN and WILLIAM E. WINE, both citizens of the United States, WILLIAM F. CREMEAN residing at Wilkes-Barre, State of Pennsylvania, and WILLIAM E. WINE residing at Toledo, State of Ohio, have invented certain new and useful Improvements in Brake-Shoe-Key Locks, of which the following is a full, clear, and exact description, reference being had to the accompanying drawing forming a part thereof.

Our invention relates to certain new and useful improvements in means for securing and retaining the brake shoe key in its functional position and has for its object to prevent the losing of the brake shoe keys.

With these and other objects hereinafter explained, in view, our invention consists in the construction and combination of elements herein described and claimed.

In the accompanying drawing, which illustrates the preferred embodiments of our invention, Figure 1 shows a side view of a portion of a brake head, brake shoe and brake shoe key and also a locking or retaining member for the key; Fig. 2 shows a plan view of parts shown in Fig. 1, but for the sake of clearness the brake shoe is removed; Fig. 3 shows a modified form of retaining member in its proper position in the brake head; Fig. 4 is a side view of Fig. 3; Fig. 5 is a partial plan view of retaining member shown in Figs. 3 and 4; Fig. 6 shows a further modification of the retaining member applied in position; Fig. 7 is a side view of Fig. 6; Fig. 8 is a still further modification of the device applied in position; Fig. 9 is a side view of Fig. 8; Fig. 10 is a partial plan view of retaining member shown in Figs. 8 and 9.

Similar characters designate several parts throughout the several figures of the drawing.

Referring to the parts by number, 1 represents a brake head; 2 represents a brake shoe; 3 represents a brake shoe key.

In Figs. 1 and 2 the brake head 1 is provided with shoulders, or lugs 4, which are adapted to engage the brake shoe key retainer 5. The retainer 5 is provided with an opening, or slot 6, through which extends the brake shoe key 3. The retainer 5 is also provided with a vertical portion 7, the top end 8 of which is bent over the top of brake shoe key 3 after it is in place and thereby retains the brake shoe key against removal.

In Figs. 3 and 4 the brake head 1 is provided with slots $4^a$, which are adapted to engage the brake shoe retainer $5^a$. The retainer $5^a$ is provided with an opening or slot, $6^a$, through which extends the brake shoe key 3. The retainer $5^a$ is also provided with a vertical portion $7^a$, of which the top end $8^a$ is bent over the top of the brake shoe key after it is in place.

In Figs. 6 and 7 the brake shoe key retainer 9 is so constructed that the portion 10 engages a portion of the brake head and thereby prevents vertical movement of same. The retainer 9 is provided with a vertical portion 11, the top end 12 of which is bent over the top of the brake shoe key 3 after it is in place.

In Figs. 8 and 9 the brake shoe key retainer $9^a$ is so constructed that the portion $10^a$ engages a portion of the brake head, and thereby prevents vertical movement of same. The retainer $9^a$ is provided with a vertical portion $11^a$, the top end $12^a$ of which is bent over the top of the brake shoe key 3 after it is in place.

The numbers $8'$, $8^{a'}$, $12'$ and $12^{a'}$ show the upper portion of the brake shoe retainer before bending into position for retaining the brake shoe key.

The process of assembling the parts is as follows: The brake shoe is placed in its position on the brake head, the retainer then placed in position and then the brake shoe key is driven down into its normal position, then the top of the retainer is bent by means of a hammer over the top of the key.

It will thus be seen that the key will be held in its normal position until the top portion of retainer is removed or bent back from over the top of the key.

It will be understood from this description that although the improvements in this invention are simple, they accomplish in a thoroughly practical manner all the objects sought. We wish it further understood that we do not desire to be limited to the specific construction or arrangement of elements shown and described, as it is obvious that changes in construction and arrangement may be made without departing from the spirit of the invention.

Having thus described out invention, we aim in the appended claims to cover all modifications which do not involve a departure from its spirit and scope.

What we claim as new and desire to secure by Letters Patent of the United States is:

1. In a brake shoe key lock, the combination with a brake head, a brake shoe and a brake shoe key of means for retaining said key comprising a member engaging said brake head and having a portion extending laterally above said key, said member being held in engagement with said brake head by said key.

2. In a brake shoe key lock, the combination with a brake head, a brake shoe and a brake shoe key of means for retaining said key comprising seats on said brake head, a member engaging said seats and said key, said member being held in engagement with said seats by said key, said member also being provided with a portion extending laterally above the top of said key for retaining same in engaging relation with said brake head and said brake shoe.

3. In a brake shoe key lock, the combination with a brake head, a brake shoe and a brake shoe key of means for retaining said key comprising a bent plate having a lower horizontally extending portion engaging said brake head and said key and an upper portion extending laterally above and in line with the top of said key.

4. In a brake shoe key lock, the combination with a brake head, a brake shoe and a brake shoe key of means for retaining said key comprising a member extending substantially parallel to said key, having a bent lower portion engaging said brake head and its upper portion engaging an upper surface of the top of said key.

5. In a brake shoe key lock, the combination with a brake head and a brake shoe key of means for retaining said key comprising a member extending substantially parallel to said key, having its lower end disposed beneath a portion of said brake head and its upper end adapted to be bent over the top of said brake shoe key.

6. In a brake shoe key lock, the combination with a brake head and a brake shoe key of means for retaining said key, comprising an angle shaped member, having its horizontal leg perforated to receive said key and adapted to engage the under side of a ledge on said brake head, the vertical leg of said angle shaped member being adapted to be bent over the top of said key.

This specification signed and witnessed this 25th day of Feb. 1919.

W. F. CREMEAN.
W. E. WINE.

In the presence of—
EDWARD M. TENNEY,
MADELINE R. STOUFFER.